United States Patent
Gopal et al.

(10) Patent No.: US 11,044,339 B2
(45) Date of Patent: Jun. 22, 2021

(54) ASYNCHRONOUS SERVICE PROVISIONING IN COMPUTING SYSTEMS

(71) Applicant: Microsoft Technology Licensing, LLC, Redmond, WA (US)

(72) Inventors: Burra Gopal, Bellevue, WA (US); Krishna Raghava Mulubagilu Panduranga Rao, Bellevue, WA (US); Darell Macatangay, Redmond, WA (US); Patrick Kabore, Redmond, WA (US); Ramanathan Somasundaram, Bothell, WA (US); Constantin Stanciu, Redmond, WA (US); Sean Squires, Edmonds, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 706 days.

(21) Appl. No.: 15/497,163

(22) Filed: Apr. 25, 2017

(65) Prior Publication Data
US 2018/0309847 A1 Oct. 25, 2018

(51) Int. Cl.
*H04L 29/08* (2006.01)

(52) U.S. Cl.
CPC .......... *H04L 67/34* (2013.01); *H04L 67/1095* (2013.01); *H04L 67/32* (2013.01)

(58) Field of Classification Search
CPC .......... H04L 43/10; H04L 67/125; H04B 7/14
See application file for complete search history.

(56) References Cited

U.S. PATENT DOCUMENTS

| 5,870,550 | A | * | 2/1999 | Wesinger, Jr. | .......... G06F 21/42 709/218 |
| 7,152,109 | B2 | | 12/2006 | Suorsa et al. | |
| 8,250,570 | B2 | | 8/2012 | Suorsa | |
| 9,037,722 | B2 | | 5/2015 | Jensen-Horne et al. | |
| 9,195,776 | B2 | * | 11/2015 | Chandak | ............. G06F 16/9577 |
| 9,225,625 | B1 | * | 12/2015 | He | ......... G06F 9/542 |

(Continued)

OTHER PUBLICATIONS

Roy, et al., "Site provisioning in the SharePoint add-in model", https://msdn.microsoft.com/en-us/pnp_articles/site-provisioning-sharepoint-add-in, Published on: , 12 pages.

(Continued)

*Primary Examiner* — Ario Etienne
*Assistant Examiner* — Kidest Mendaye
(74) *Attorney, Agent, or Firm* — Liang IP, PLLC

(57) ABSTRACT

Techniques for asynchronous site provisioning in distributed computing systems are disclosed herein. In one embodiment, a method can include receiving a user request to initiate a provisioning process for a site. The user request can contain one or more specified features or functionalities for the site. The method also includes in response to the received user request from the user, performing provisioning of the site without provisioning for at least one of the specified features in the user request and providing the provisioned site for access by the user upon completion of performing provisioning of the site. The method further includes continuing provisioning the at least one of the specified features included in the user request while allowing the user to access the provided site without the at least one of the specified features via the computer network.

20 Claims, 10 Drawing Sheets

(56) References Cited

U.S. PATENT DOCUMENTS

| | | | | |
|---|---|---|---|---|
| 2002/0194251 A1* | 12/2002 | Richter | ............. | G06F 9/5011 |
| | | | | 718/105 |
| 2007/0061705 A1* | 3/2007 | Ammerlaan | ......... | G06F 16/958 |
| | | | | 715/205 |
| 2007/0220019 A1* | 9/2007 | Zhiyanov | ............. | G06F 16/958 |
| 2008/0275939 A1 | 11/2008 | Martin | | |
| 2015/0120938 A1* | 4/2015 | Mordani | ............ | H04L 41/5041 |
| | | | | 709/226 |
| 2015/0310124 A1* | 10/2015 | Ben-Aharon | ......... | G06F 17/212 |
| | | | | 715/205 |
| 2016/0164723 A1* | 6/2016 | Cimprich | ............ | H04L 41/0806 |
| | | | | 709/221 |
| 2017/0032050 A1* | 2/2017 | Kol | ..................... | G06F 3/0482 |

OTHER PUBLICATIONS

Tut, Radu, "Feature stapling and site provisioning challenges", https://radutut.wordpress.com/2013/02/10/feature-stapling-and-site-provisioning-challenges/, Published on: Feb. 10, 2013, 7 pages.

"SharePoint Custom Provisioning Provider", https://www.codeproject.com/Articles/185209/SharePoint-Custom-Provisioning-Provider, Published on: Mar. 18, 2012, 13 pages.

\* cited by examiner

ASYNCHRONOUS SERVICE PROVISIONING IN COMPUTING SYSTEMS

BACKGROUND

Content management systems are computing systems that can support management of digital content by users. Common features of content management systems include web-based publishing, format management, history editing and version control, indexing, searching, and retrieval. To provide such features, content management systems can utilize a collection of remote servers interconnected by one or more computer networks to provide computing, storage, communications, or other functionalities. During operation, one or more remote servers can cooperate to provide a distributed computing environment that facilitates activation and/or execution of various applications or features to provide desired functionalities of content management.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain content management systems, content and associated content management functionalities can be grouped into network accessible containers. One example container is a SharePoint® site, which is a web-addressable location to store, organize, share, and access content via, for example, an intranet or the Internet. A SharePoint® site can have features representing various functionalities and behaviors that can be activated or deactivated by site administrators or users. Such features can be used to expose content management functionalities as well as allowing users of the site to obtain data from external sources.

A user can create a site by providing a content management system with user credentials and a list of desired features of content management. Upon verification, the content management system can provision for the requested site before access to the site can be permitted. Such site provisioning can include placing a configuration file of the site in a content database, activating the requested list of desired features, appropriately securing the site, and providing access to the site over a computer network. For instance, providing access to the site can include specifying IP addresses, IP Gateways, virtual networks, Domain Name System ("DNS") parameters, or other network parameters to suitable computer networks and storage resources. In another example, activating features can include first selecting one or more servers from a pool of available servers in datacenters, computing clusters, or other computing facilities. Images or copies of operating systems, device drivers, middleware, applications, or other suitable software components can then be located and provided to the selected servers. The software components can then be configured to generate a boot image for the selected servers. The servers can then start one or more virtual machines to load and execute the software components to provide the desired features.

In certain content management systems, site provisioning can be performed in a synchronized manner. For example, access to the requested site is allowed for first use only after all of the desired features have been activated. In other words, the first use of the site is synchronized with activation of all of the desired features. Such synchronized site provisioning can have several drawbacks. First, activating all of the features can take a long time (e.g., up to two minutes) before a user is allowed the first use. Such a long delay can negatively impact user experience of the content management system. Also, activation of one or more features for the requested site can fail due to software bugs, application conflicts, inappropriate configurations, or other reasons. When such failures occur, the entire site provisioning process can fail such that the user is not allowed to even have the first use. In addition, such synchronized site provisioning does not provide on-demand feature activation for additional features after the first use.

Several embodiments of the disclosed technology can address at least some of the foregoing drawbacks by implementing asynchronous site provisioning according to which multiple self-contained provisioning stages are performed to incrementally expand the features available at the requested site. For example, in certain embodiments, an initial provisioning stage can include creating a "bare-bone" site that is network accessible without activating at least some of the features initially requested by a user. In certain implementations, the bare-bone site can be generated by copying a template to create a site instance upon which various site parameters can be set. The template can include one or more Extensive Markup Language ("XML"), HyperText Markup Language ("HTML"), or other suitable types of files created by a site administrator, a database operator, or other suitable entities. The site parameter can include an identification of a site owner, tenancy, DNS parameters, or other suitable parameters. In other implementations, the bare-bone site may be created by the requesting user or in other suitable manners. Once the bare-bone site is network accessible, the content management system can present the bare-bone site to the requesting user for a first use. As such, the user can access the site and can utilize features included in the site template to interact with content of the site without long delays.

In accordance with aspects of the disclosed technology, while the bare-bone site is provided to the user for a first use, the content management system can continue provisioning additional features requested by the user. For example, the content management system can continue set one or more parameters of a user interface of the site. Such parameters can include a layout, font, size, or other suitable settings of the user interface. In another example, the content management system can also continue to select one or more servers from a pool of available servers, providing images of operating systems, device drivers, middleware, applications, or other suitable software components to the selected servers, and start one or more virtual machines to load and execute the software components to provide the requested features.

In accordance with additional aspects of the disclosed technology, the content management system can also provide facilities to the user to activate additional features on the bare-bone site. The additional features may be those initially requested by the user or other features not initially requested by the user. For example, the bare-bone site can include dropdown menus, galleries, or other suitable interface elements configured to allow the user to add one or more features to the site. If the added feature is one initially requested, the content management system can ignore the request; otherwise, the content management system can provision for the requested additional features sequentially, concurrently, or in other suitable manners.

Several embodiments of the disclosed technology can thus provide fast, scalable, and error-tolerant site provisioning when compared to synchronous site provisioning techniques. By providing the bare-bone site with only a limited number of configuration operations, the content management system can allow a first use of the bare-bone site with little or no delay. Also, the content management system can allow the user to add features to the bare-bone site on-demand. As such, the number of features on the site can be scalable. Further, even when provisioning of a requested feature fails, the site with other added features can still be functional. Thus, the site provisioning process can be robust and error tolerant, resulting in improved user experience of the content management system.

DETAILED DESCRIPTION

Figure 1A:
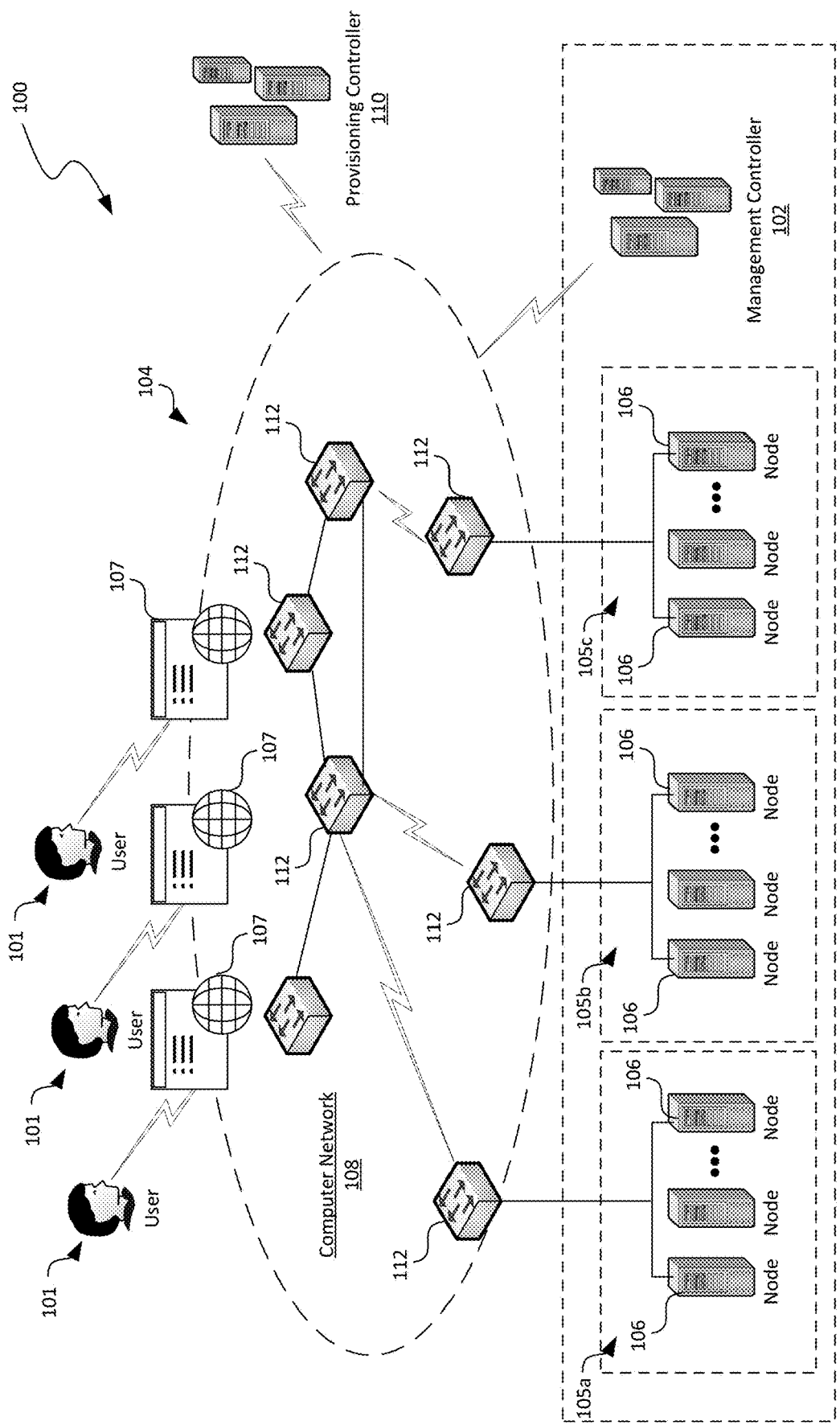
FIG. 1A is a schematic diagram of a distributed computing system implementing asynchronous site provisioning in accordance with embodiments of the disclosed technology.

Certain embodiments of computing systems, devices, components, modules, routines, and processes for asynchronous provisioning of cloud services in distributed computing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1A-5.

As used herein, the term "computing cluster" generally refers to a computer system having a plurality of network devices that interconnect multiple servers or nodes to one another or to external networks (e.g., the Internet). One example of a computing cluster is one or more racks each holding multiple servers in a cloud computing datacenter (or portions thereof) configured to provide cloud services. One or more computing clusters can be interconnected to form a "computing fabric." The term "network device" generally refers to a network communications component. Example network devices include routers, switches, hubs, bridges, load balancers, security gateways, or firewalls. A "node" generally refers to a computing device configured to implement one or more virtual machines, virtual routers, virtual gateways, or other suitable virtualized computing components. For example, a node can include a computing server having a hypervisor configured to support one or more virtual machines.

Also used herein, the term "cloud service" or "computing service" generally refers to computing resources provided over a computer network such as the Internet. Common examples of cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Further, as used herein, the term a "site" generally refers to a network accessible container having content and associated features of content management configured by a site owner. One example container is a SharePoint® site, which is a web-addressable location to store, organize, share, and access content via, for instance, an intranet or the Internet. "Features" of a site are computer programs having codes that extend the functionality of the site in some ways. Features can be authored using HTML, JavaScript, CSS, or other web technologies. At a basic level, a feature of a site provides a user a way to create, inspect, monitor, delete, and configure content of the site, cloud assets, or other suitable resources. For example, a feature on a site can include a display of a list of news, documents, links, or other suitable types of content of the site. In another example, a feature can also include a computer program configured to retrieve data (e.g., weather forecast) from an external source and display/update the retrieved data on the site.

Also used herein, the term "site provisioning" or "provisioning" generally refers to a set of preparatory actions for providing a network accessible site requested by a user in a distributed computing system. For example, provisioning can include placing a configuration file of the site in a content database, activating the requested list of desired features, appropriately securing the site, and providing access to the site over a computer network. In another example, provisioning can also include selecting one or more servers from a pool of available servers in datacenters, computing clusters, or other computing facilities. Provisioning can further include locating and providing access to images of operating systems, device drivers, middleware, applications, or other suitable software components related to the cloud services. The images of the software components can then be configured to generate a boot image for the selected servers. Provisioning can yet further include assigning IP addresses, IP Gateways, virtual networks, DNS servers, or other network parameters to the selected servers and/or executed software components. The servers can then load and execute the software components in order to provide features of the site.

In certain computing systems, site provisioning is performed in a synchronized manner that a first use to a requested site is allowed only after all of the requested features are activated. Such synchronized site provisioning can have several drawbacks. First, activating all of the features can take a long time (e.g., up to two minutes) before a user is allowed a first use. Such a long delay can negatively impact user experience. Also, activation of one or more features for the requested site can fail due to software bugs, application conflicts, inappropriate configurations, or other reasons. When such failures occur, the entire site provisioning process fails such that the user is not allowed to even have the first use. In addition, such synchronized site provisioning does not provide on-demand feature activation for additional features after a first use.

Several embodiments of the disclosed technology can address at least some of the foregoing drawbacks by implementing asynchronous site provisioning according to which multiple self-contained provisioning stages are performed to incrementally expand the features available at a site. In certain embodiments, an initial provisioning stage can include creating a basic site that is network accessible without activating at least some of the features initially requested by a user. The created basic site can then be provided to the user for a first use with little or no delay after the user submits the request for the site. while the basic site is provided to the user for first use, the content management system can continue provisioning additional features requested by the user or allow the user to activate other features. As such, even when provisioning of a requested feature fails, the site with other added features can still be functional, as described in more detail below with reference to FIGS. 1A-5.

FIG. 1A is a schematic diagram illustrating a distributed computing system 100 implementing asynchronous site provisioning in accordance with embodiments of the disclosed technology. In certain embodiments, the distributed computing system 100 can be a content management system. In other embodiments, the distributed computing system 100 can also be other suitable types of computing system. As shown in FIG. 1A, the distributed computing system 100 can include a computer network 108 interconnecting a plurality of users 101, a computing fabric 104, and a provisioning controller 110. Even though particular components of the computing system 100 are shown in FIG. 1A, in other embodiments, the distributed computing system 100 can also include additional and/or different constituents. For example, the distributed computing system 100 can also include additional computing fabrics (not shown) interconnected with one another, network storage devices, utility infrastructures, and/or other suitable components.

As shown in FIG. 1A, the computer network 108 can include one or more physical network devices 112 that interconnect the users 101, the computing fabric 104, and the provisioning controller 110. Examples of the network devices 112 can include routers, switches, firewalls, load balancers, or other suitable network components. Even though particular connection scheme is shown in FIG. 1A for illustration purposes, in other embodiments, the network devices 112 can be operatively coupled in a hierarchical, flat, "mesh," or other suitable topologies.

The computing fabric 104 can include a management controller 102 and a plurality of nodes 106 operatively coupled to one another by the network devices 112. In certain embodiments, the nodes 106 can individually include a processor, a physical server, or a blade containing several physical servers. In other embodiments, the nodes 106 can also include a virtual server or several virtual servers. The nodes 106 can be organized into racks, availability zones, groups, sets, computing clusters, or other suitable divisions. For example, in the illustrated embodiment, the nodes 106 are grouped into three computing clusters 105 (shown individually as first, second, and third computing clusters 105a-105c, respectively), which are operatively coupled to corresponding network devices 112 in the computer network 108. Even though three computing clusters 105 are shown in FIG. 1A for illustration purposes, in other embodiments, the computing fabric 104 can include one, two, eight, sixteen, or any other suitable numbers of computing clusters 105 with similar or different components and/or configurations.

The management controller 102 can be configured to monitor, control, or otherwise manage operations of the nodes 106 in the computing clusters 105. For example, in certain embodiments, the management controller 102 can include a fabric controller configured to manage processing, storage, communications, or other suitable types of hardware resources in the computing clusters 105 for hosting computing services. In other embodiments, the management controller 102 can also include a datacenter controller, application delivery controller, or other suitable types of controller. In the illustrated embodiment, the management controller 102 is shown as being separate from the computing clusters 105. In other embodiments, the management controller 102 can include one or more nodes 106 in the computing clusters 105. In further embodiments, the management controller 102 can include software services hosted on one or more of the nodes 106 in the computing clusters 105.

The provisioning controller 110 can be configured to implement asynchronous site provisioning in the distributed computing system 100. Asynchronous site provisioning can include receiving a user request for a site with a list of requested features for the site. In response to the received user request, multiple self-contained provisioning stages can be performed by, for example, the management controller 102, one or more nodes 106, and/or the provisioning controller 110, to incrementally expand features available at a site provided by the distributed computing system 100. For example, an initial provisioning stage can include creating a basic or "bare-bone" site that is network accessible without activating at least one or more of the features initially requested by the user. Once the basic site is ready for first use, the distributed computing system 100 can allow access to the basic site while continuing provisioning additional features requested by the user at one or more subsequent provisioning stages. the distributed computing system 100 can also provide facilities to the user to activate on the provided site additional features that are not initially requested. Certain example components of the provisioning controller 110 and details of operations are described in more detail below with reference to FIGS. 2A-3D.

Even though the provisioning controller 110 is shown in FIG. 1A as a separate component from the management controller 102 and the nodes 106 of the distributed computing system 100, in other embodiments, functionalities of the provisioning controller 110 can a part of the management controller 102. In further embodiments, functionalities of the provisioning controller 110 can also be provided by one or more computing services hosted on one or more of the nodes 106.

In operation, the users 101 can request deployment of a site via, for example, user portals 107. Unlike in other computing systems, several embodiments of the distributed computing system 100 can allow the users 101 fast first use of the requested site by performing site provisioning at multiple self-contained provisioning stages. For example, in certain embodiments, an initial provisioning stage can include creating a basic site that is network accessible without activating at least some of the features initially requested by the users 101. Once the basic site is network accessible, the distributed computing system 100 can present the basic site via user interfaces (shown in FIGS. 2B and 2C) to the requesting users 101 for first use. As such, the users 101 can access the site via the user interfaces to activate additional features on the site, as described in more detail below with reference to FIGS. 2A-3D.

Figure 1B:
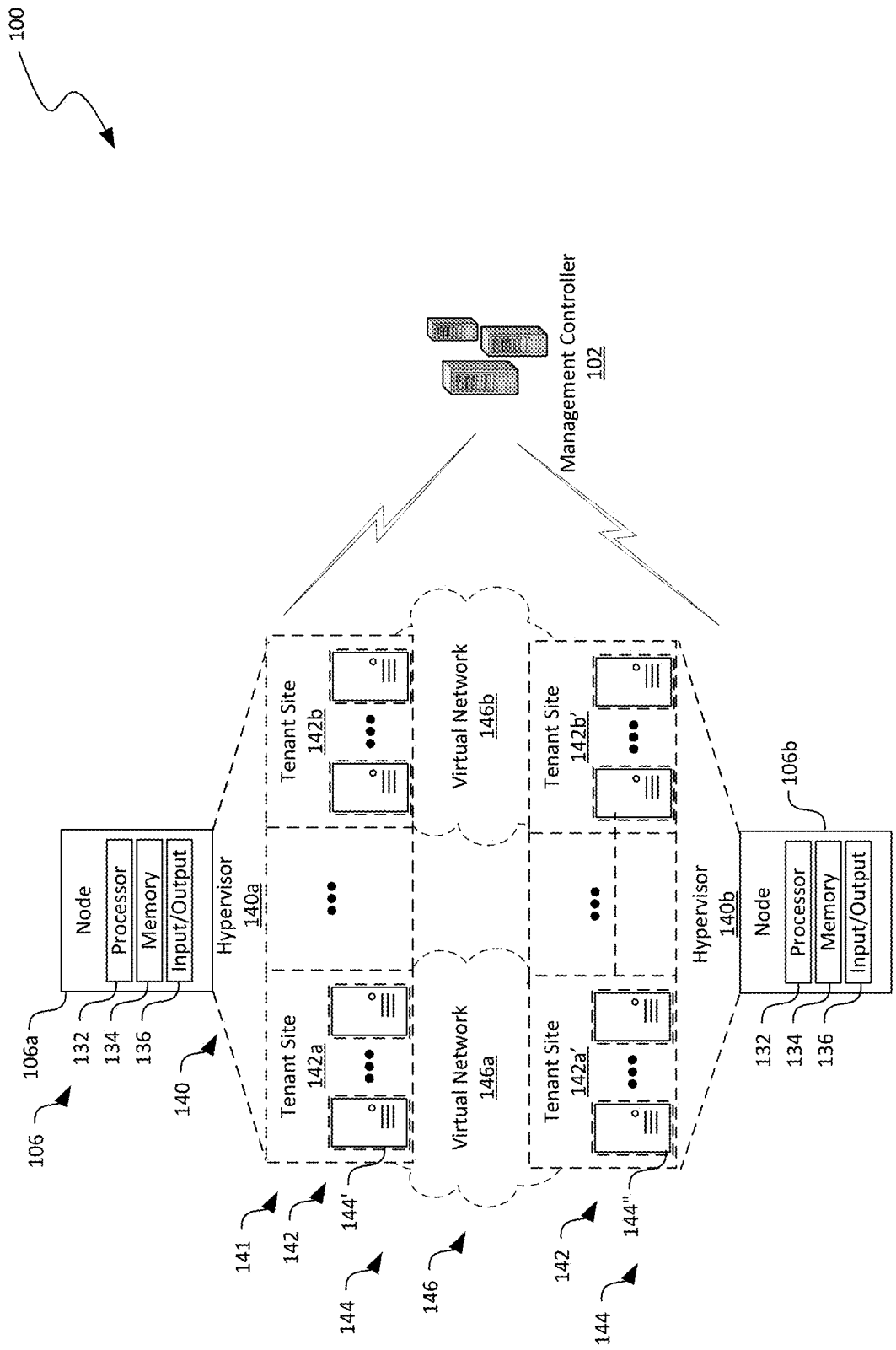
FIG. 1B is a schematic diagram illustrating certain hardware/software components of the distributed computing system of FIG. 1A in accordance with embodiments of the disclosed technology.

FIG. 1B is a schematic diagram illustrating certain hardware/software components of the distributed computing system 100 of FIG. 1A in accordance with embodiments of the disclosed technology. In FIG. 1B, only certain components of the computer network 108 of FIG. 1A are shown for clarity. As shown in FIG. 1B, the first node 106a and the second node 106b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIG. 5). The input/output component 136 can include a display, a touch screen, a keyboard, a mouse, a printer, and/or other suitable types of input/output devices configured to accept input from and provide output to an operator and/or an automated software controller (not shown).

The memory 134 of the first and second nodes 106a and 106b can include instructions executable by the corresponding processors 132 to cause the individual processors 132 to provide a hypervisor 140 (identified individually as first and second hypervisors 140a and 140b) and other suitable components (not shown). The hypervisors 140 can individually be configured to initiate, monitor, terminate, and/or otherwise locally manage one or more virtual machines 144 organized into tenant sites 142. For example, as shown in FIG. 1B, the first node 106a can provide a first hypervisor 140a that manages first and second tenant sites 142a and 142b, respectively. The second node 106b can provide a second hypervisor 140b that manages first and second tenant sites 142a' and 142b', respectively.

The hypervisors 140 can be software, firmware, or hardware components. The tenant sites 142 can each include multiple virtual machines 144 or other suitable tenant instances for a particular tenant. For example, the first node 106a and the second node 106b can both host the tenant site 142a and 142a' for a first user 101a (FIG. 1A). The first node 106a and the second node 106b can both host the tenant site 142b and 142b' for a second user 101b (FIG. 1A). Each virtual machine 144 can be executing a corresponding operating system, middleware, and/or applications.

Also shown in FIG. 1B, the distributed computing system 100 can include one or more virtual networks 146 that interconnect the tenant sites 142a and 142b across multiple nodes 106. For example, a first virtual network 142a interconnects the first tenant sites 142a and 142a' at the first node 106a and the second node 106b. A second virtual network 146b interconnects the second tenant sites 142b and 142b' at the first node 106a and the second node 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another via the computer network 108 (FIG. 1A) even though the virtual machines 144 are located on different nodes 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

Figure 2A:
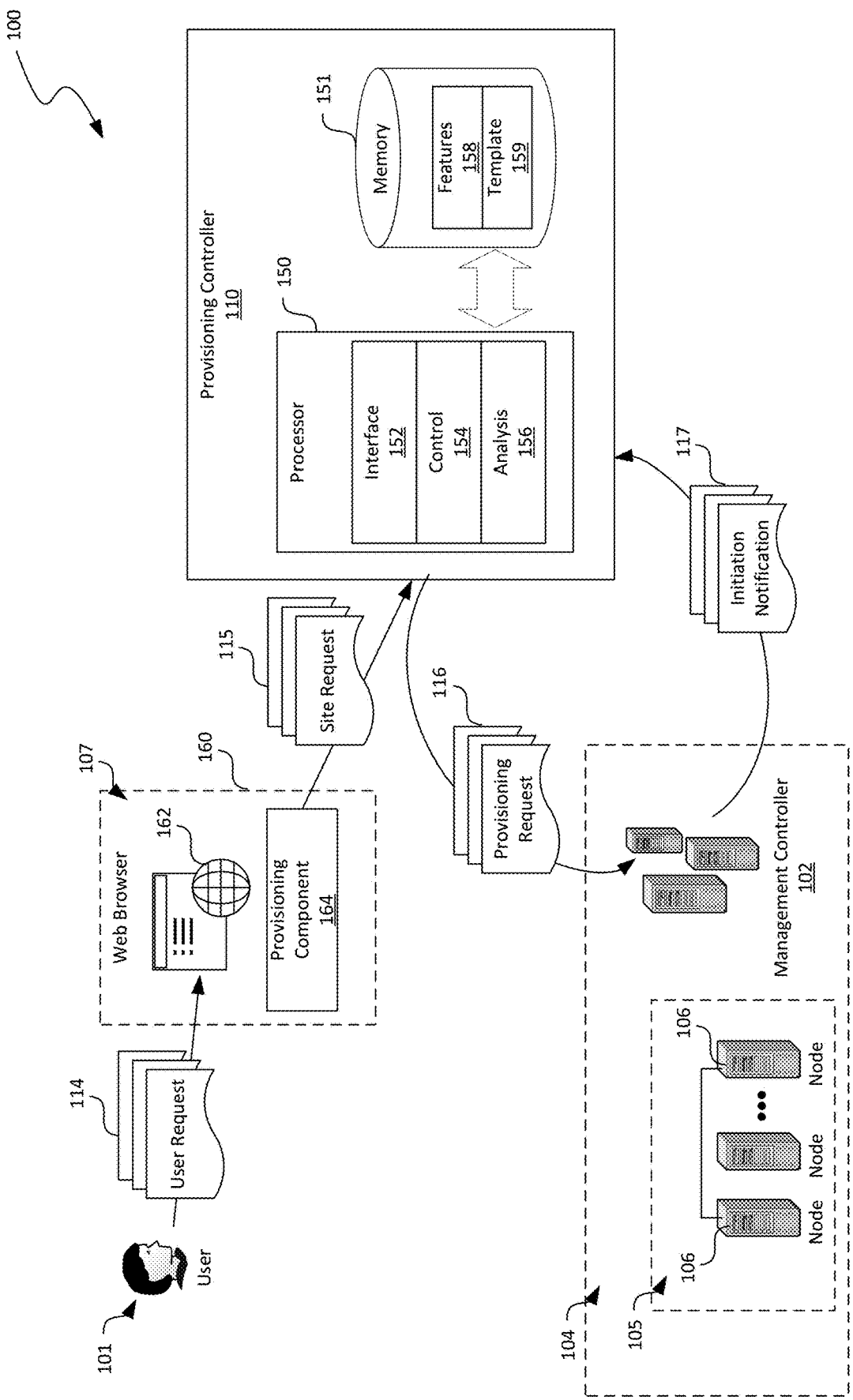
FIGS. 2A-2C are schematic diagrams illustrating certain hardware/software components of the distributed computing system in FIG. 1A during certain stages of a provisioning process.
Figure 2B:
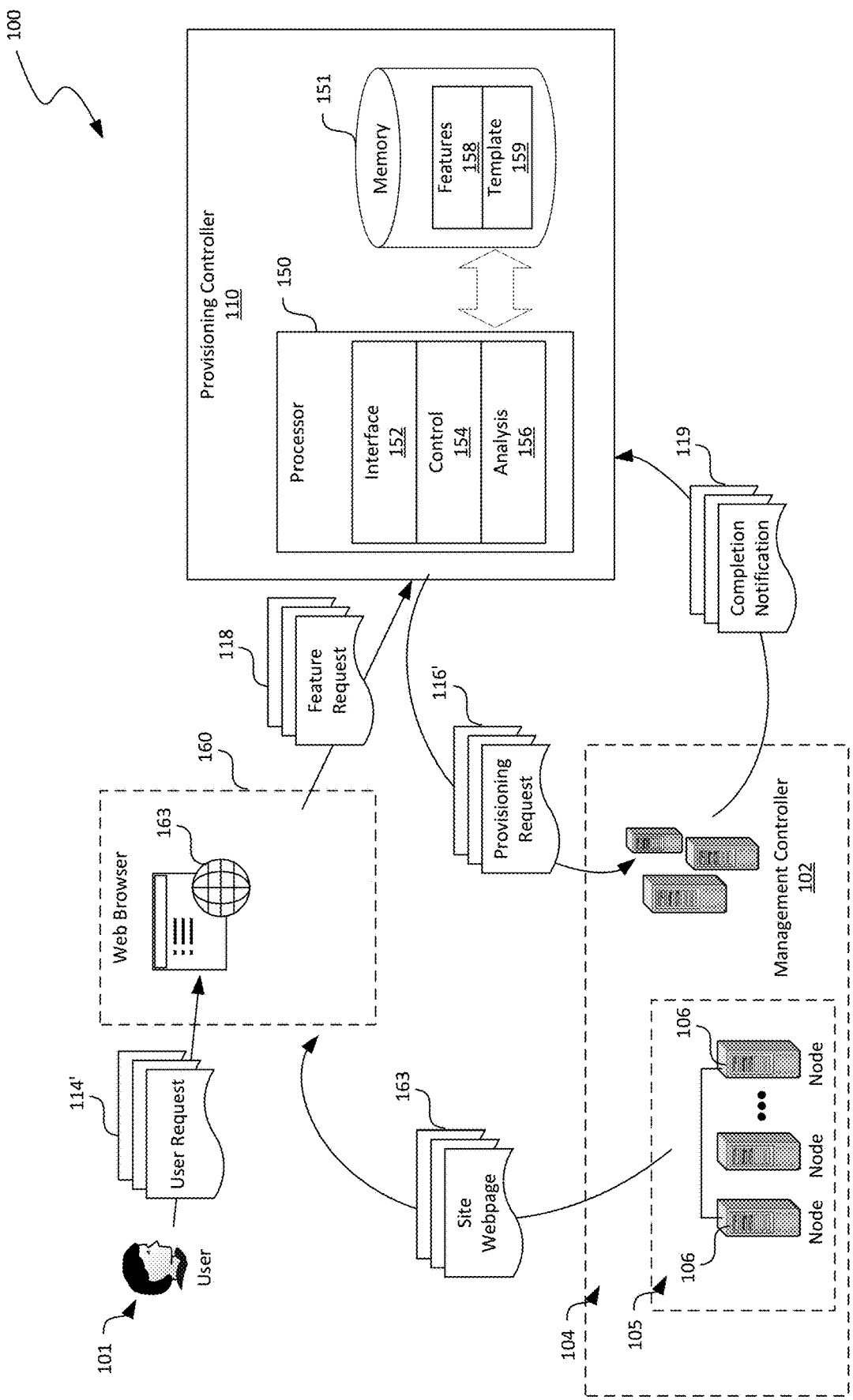
Figure 2C:
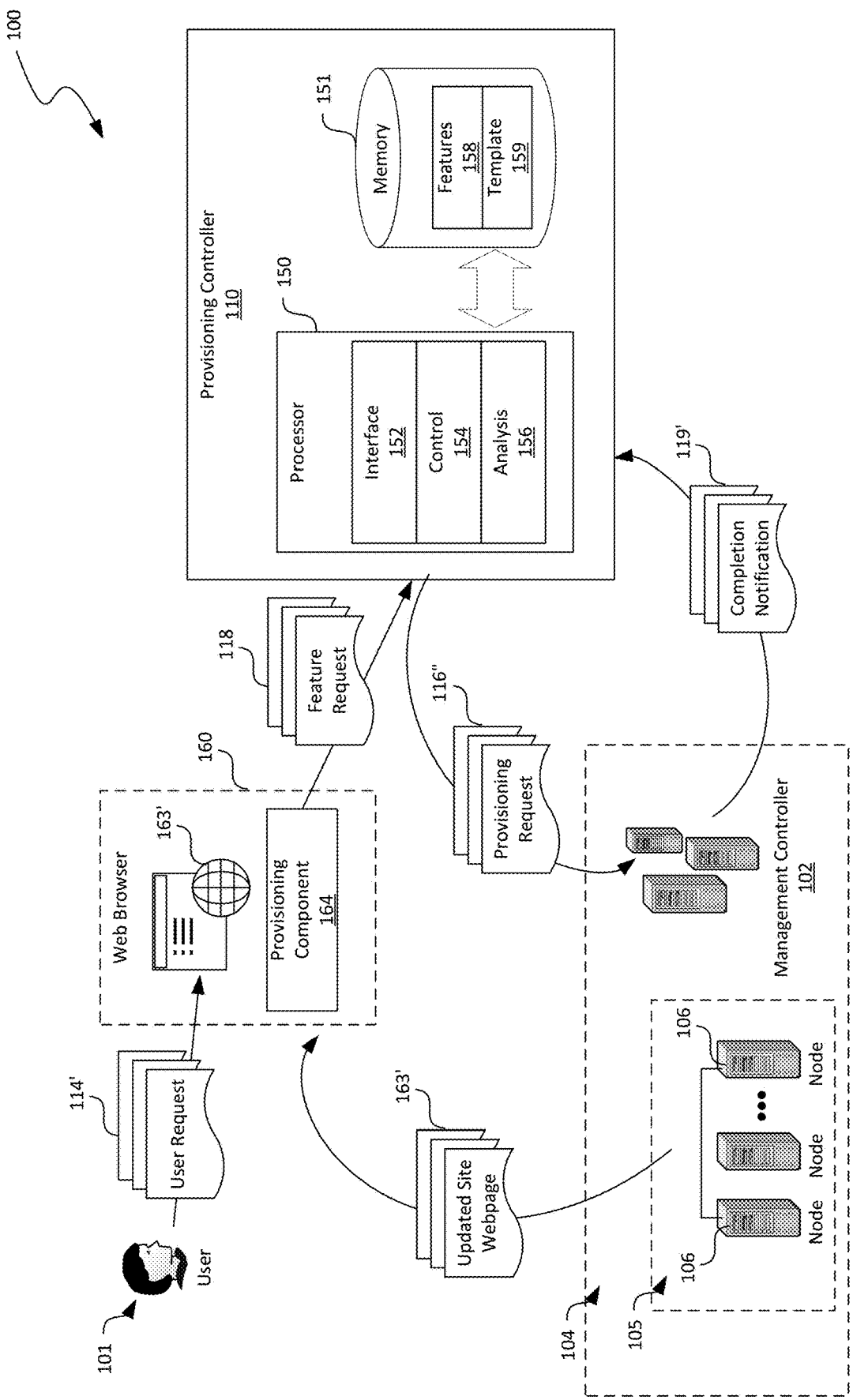

FIGS. 2A-2C are schematic diagrams illustrating certain hardware/software components of the distributed computing system 100 in FIG. 1A during certain stages of a site provisioning process. In particular, FIGS. 2A-2C illustrate the distributed computing system 100 during an initiation stage, a feature addition stage, and a completion stage of a site provisioning process, respectively. In FIGS. 2A-2C, certain components of the distributed computing system 100 are omitted for clarity. For example, only one computing cluster 105 is shown in FIGS. 2A-2C for illustration purposes.

In addition, in FIGS. 2A-2C and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the user 101 can access the user portal 107 in a web browser 160 provided by a client device (e.g., a desktop computer, not shown) for requesting a site to be hosted in the distributed computing system 100 of FIG. 1A. The web browser 160 can include an input display 162 and a provisioning component 164 operatively coupled to one another. In the illustrated embodiment, the input display 162 includes one or more input fields displayable on the user portals 107 to receive specification data of the site to be deployed. Example user interfaces showing the input display 162 and the site webpages 163 (shown in FIG. 2B) are described in more detail below with reference to FIGS. 3A-3D.

The provisioning component 164 can be configured to manage requests for a site to be hosted in the distributed computing system 100. In the illustrated embodiment, the user 101 can provide a user request 114 to the input display 162 in the web browser 160. The user request 114 can include a name, a template, a list of one or more specified features, a location, or other suitable information related to the requested site. In other embodiments, the user 101 can also provide display configurations, credentials, execution configurations, subscription information, or other suitable data to the web browser 160. In further embodiments, a developer, administrator, or other suitable types of entity can provide the configurations, and/or other suitable information in lieu of or in addition to the user 101.

In one embodiment, the provisioning component 164 can include instructions executable in the web browser 160 (or external to the web browser 160) to generate and transmit a site request 115 to the provisioning controller 110 via the computer network 108 in FIG. 1A. The provisioning component 164 can compile, arrange, annotate, or perform other suitable operations on various information included in the user request 114 in order to create the site request 115 according to suitable protocols of the provisioning controller 110.

Also shown in FIG. 2A, the provisioning controller 110 can include a processor 150 operatively coupled to a memory 151. The processor 150 can include a microprocessor, a field-programmable gate array, and/or other suitable logic devices. The memory 132 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 150 (e.g., instructions for performing the methods discussed below with reference to FIGS. 4A-4C). The memory 151 of the provisioning controller 110 can contain instructions (not shown) executable by the processor 150 to cause the processor 150 to provide various software components. For example, as shown in FIG. 2A, the processor 150 can provide an interface component 152, a control component 154, and an analysis component 156 operatively coupled to one another. In other embodiments, the processor 150 can also provide an input component, a display component, or other suitable types of component.

The interface component 152 can be configured to output the input display 162 in the user portal 107. For example, the input display 162 can be outputted in one or more iFrames, pages, or other suitable containers in the user portal 107. The interface component 152 can also be configured to receive the site request 115, feature request 118 (FIG. 2B), notifications, or other suitable types of messages from the web browser 160 and forward the messages to the control component 156 and the analysis component 156 for further processing. In certain embodiments, the interface component 152 can include an application programming interface ("API") accessible by the web browser 160. In other embodiments, the interface component 152 can also include a network interface driver or other suitable components configured to allow communications between the web browser 160 and the provisioning controller 110.

The analysis component 156 can be configured to analyze the received site request 115 and select an initial configuration for the requested site for fast access based on the received site request 115. For example, in certain embodiments, the analysis component 156 can scan the list of specified features included in the site request 115 and determine whether each of the features are mandatory for a first use of the site. For instance, a feature to set ownership of the site can be deemed mandatory while a feature to set certain parameters of a graphical user interface may be deemed optional. Such determination can be based on a list of criteria configurable by a site owner, an administrator, or other suitable entities. In other embodiments, the analysis component 156 can determine the initial configuration for the site based on a template 159 stored in the memory 151 in addition to or in lieu of scanning the list of features included in the site request 115. Optionally, the analysis component 156 can also be configured to store one or more records of features 158 containing the requested features in the memory 151.

Once the initial configuration is determined, the analysis component 156 can cause the control component 154 to generate and transmit a provisioning request 116 to the management controller 102 for provisioning the site with the initial configuration without at least one of the features included in the user request 114. The provisioning request 116 can trigger the management controller 102 to initialize various provisioning operations to generate a network accessible site in response to the provisioning request 116. Example provisioning operations can include generating and placing a configuration file of the site in a content database, appropriately securing the site, and providing access to the site over the computer network 108 (FIG. 1A). In other examples, provisioning the site can also include activating one or more mandatory features by selecting one or more nodes 106 (FIG. 1A), computing clusters 105 (FIG. 1A), or other computing facilities. Images or copies of operating systems, device drivers, middleware, applications, or other suitable software components can then be located and provided to the selected nodes 106. The software components can then be configured to generate a boot image for the selected nodes 106. The nodes 106 can then start one or more virtual machines to load and execute the software components to provide the features. In further embodiments, provisioning for the site can also include enumerating documents available for the site, indexing the available documents, or other suitable operations. Once the provisioning for the site is started, the management controller 102 can transmit an initiation notification 117 to the provisioning controller 110.

As shown in FIG. 2B, once the site is provisioned with the initial configuration and is accessible via the computer network 108, the management controller 102 can instruct the one or more nodes 106 to provide one or more site webpages 163 of the provisioned site for first use by the user 101. The site webpages 163 can then to displayed in the web browser 160. By interacting with the site webpages 163, the user 101 can create, read, edit, share, like, or perform other suitable content management operations in connection with the site. As described in more detail below with reference to FIG. 2C, the site webpages 163 according to the initial configuration can also provide the user 101 an ability or option to add more features not included in the initial user request 114 to the site.

In accordance with certain aspects of the disclosed technology, once the site is provisioned with the initial configuration and provided to the user 101 for a first use, the management controller 119 can also transmit a completion notification 119 to the provisioning controller 110. In response to receiving the completion notification 119, the control component 154 of the provisioning controller 110 can be configured to transmit one or more additional provisioning requests 116' to the management controller 102. Such additional provisioning requests 116' can trigger the management controller 102 to provision the at least one of the features in the user request 114 but not included in the initial configuration. In certain embodiments, the control component 154 can issue the additional provisioning requests 116' sequentially with the at least one of the features ranked based on a corresponding priority, expected provisioning time, complexity, or other suitable criteria. In other embodiments, the control component 154 can issue one additional provisioning request 116' with all of the at least one of the features included in the user request 114. In further embodiments, the control component 154 can issue one or more additional provisioning request 116' in a random, tiered, or other suitable order.

In response to receiving the additional provisioning requests 116', the management controller 120 can continue provision for the at least one of the features included in the user request 114 while the one or more nodes 106 hosting the site continue to allow access of the site via the computer network 108. Once provisioning of at least one of the features is completed, the one or more nodes 106 hosting the site can provided an updated site webpage 163' to the user 101 to be displayed in the web browser 160, as shown in FIG. 2C. As such, the user 101 can have access to the site even while the at least one of the features included in the initial user request 114 is being provisioned in the computing cluster 105. As a result, access to the requested site can be fast without much delay. Also, even if provisioning of one of the features included in the user request 114 fails, such failure would not render the entire site provisioning process to crash. Instead, the user 101 can continue to access the site and be provided with a notice that provisioning of one of the features has failed.

In accordance with additional aspects of the disclosed technology, once the site with the initial configuration is accessible to the user 101, the site can provide the user 101 with an ability or option to activate addition features not included in the initial user request 114 to the site. As shown in FIG. 2C, the user 101 can transmit an additional user request 114' via the displayed site webpage 163. In response to the received additional user request 114', the provisioning component 164 can be configured to generate and transmit a feature request 118 to the provisioning controller 110.

In certain embodiments, the interface component 152 can receive the feature request 118 and forward the received feature request 118 to the analysis component 156. In turn, the analysis component 156 can be configured to determine whether the one or more additional features in the feature request 118 are already included in the initial user request 114 (FIG. 2A). In response to determine that an additional feature is already included in the initial user request 114, the analysis component 156 can be configured to indicate to the control component 156 to ignore the requested additional feature. On the other hand, if the additional feature is not included in the initial user request 114, the analysis component 156 can indicate to the control component 154 to generate and transmit another provisioning request 116" to the management controller 102. The another provisioning request 116" triggers the management controller 102 to provision for the additional feature while the one or more nodes 106 hosting the site continues to provide access to the site. Upon completion of provisioning the additional feature, an updated site webpage 163' can be provided to the user 101 to be displayed in the web browser 160, and the management controller 102 can transmit another completion notification 119' to the provisioning controller 110.

Figure 3A:
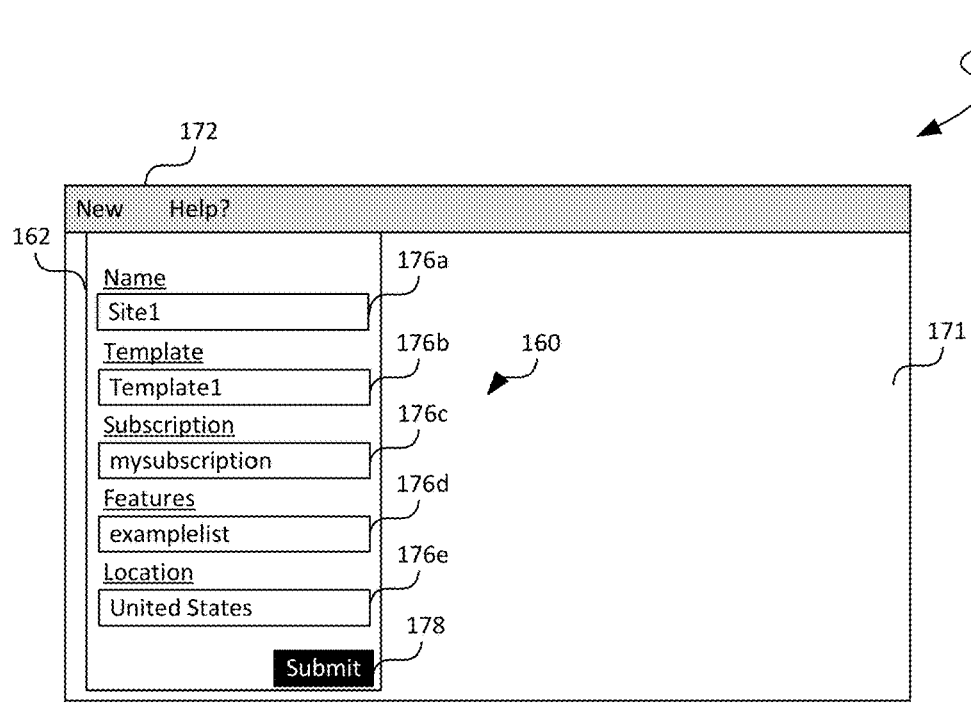
FIGS. 3A-3D are examples of graphical user interfaces illustrating operations of a provisioning process configured in accordance with embodiments of the disclosed technology.

FIGS. 3A-3D are examples of graphical user interfaces 170 suitable for the web browser 160 of FIGS. 2A-2C in accordance with embodiments of the disclosed technology. As shown in FIG. 3A, the graphical user interface 170 can include a content area 171 and a menu bar 172 having one or more menu items such as "New," "Help," etc. The graphical user interface 170 can also include one or more frames or other suitable containers to output the input display 162. For example, as shown in FIG. 3A, upon a user 101 actuates the "New" menu item, the graphical user interface 170 can output the input display 162 that includes a plurality of input fields 176a-176e. In the illustrated embodiment, input fields 176a-176e include fields for accepting a site name, a site template, subscription, features, and location, respectively. In other examples, the input display 162 can also include one or more command buttons, such as "Start" 178 that can be actuated by a user 101 (FIG. 1A).

Figure 3B:
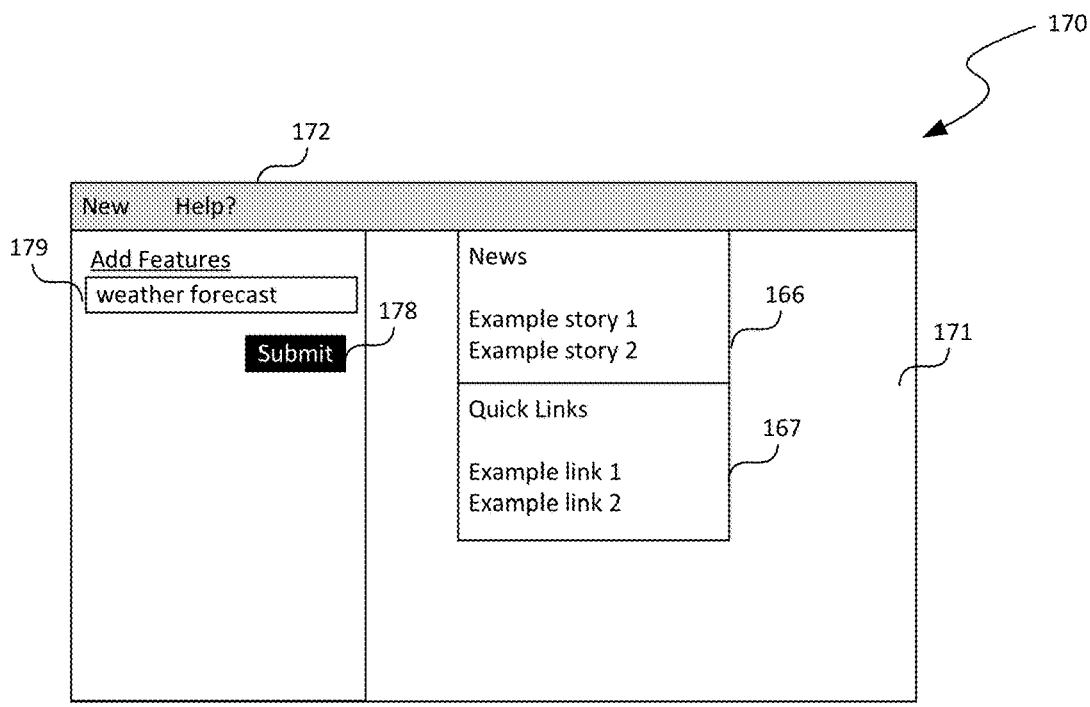

As shown in FIG. 3B, once a user 101 provides user input 114 (FIG. 2A) and actuates the "Submit" button 178, the input display 162 can be dismissed from the graphical user interface 170. The content area 171 can be configured to display the requested site with the initial configuration. For example, as shown in FIG. 3B, the site with the initial configuration can include a "News" area 166 and a "Quick Links" area 167 with corresponding example stories and links, respectively. In other example, the displayed site with the initial configuration can include a blank page or a page with other suitable display elements.

As described above with reference to FIG. 2B, while the site with the initial configuration is displayed in the content area 171, the management controller 102 (FIG. 2B) can continue to provision for one or more additional features initially requested by the user 101 by actuating the "Start" button on FIG. 3A. Upon completion of provisioning of an additional feature, the content area 171 can be updated. For instance, as shown in FIG. 3C, the updated content area 171 can include an additional weather forecast area 168 configured to retrieve and display weather data.

Figure 3C:
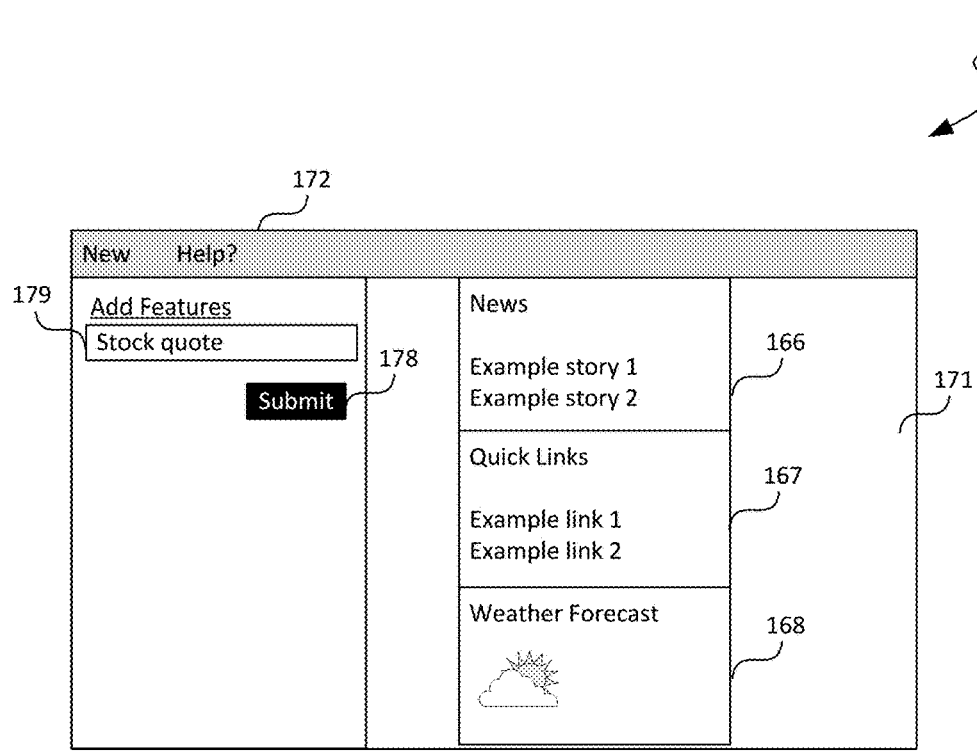
Figure 3D:
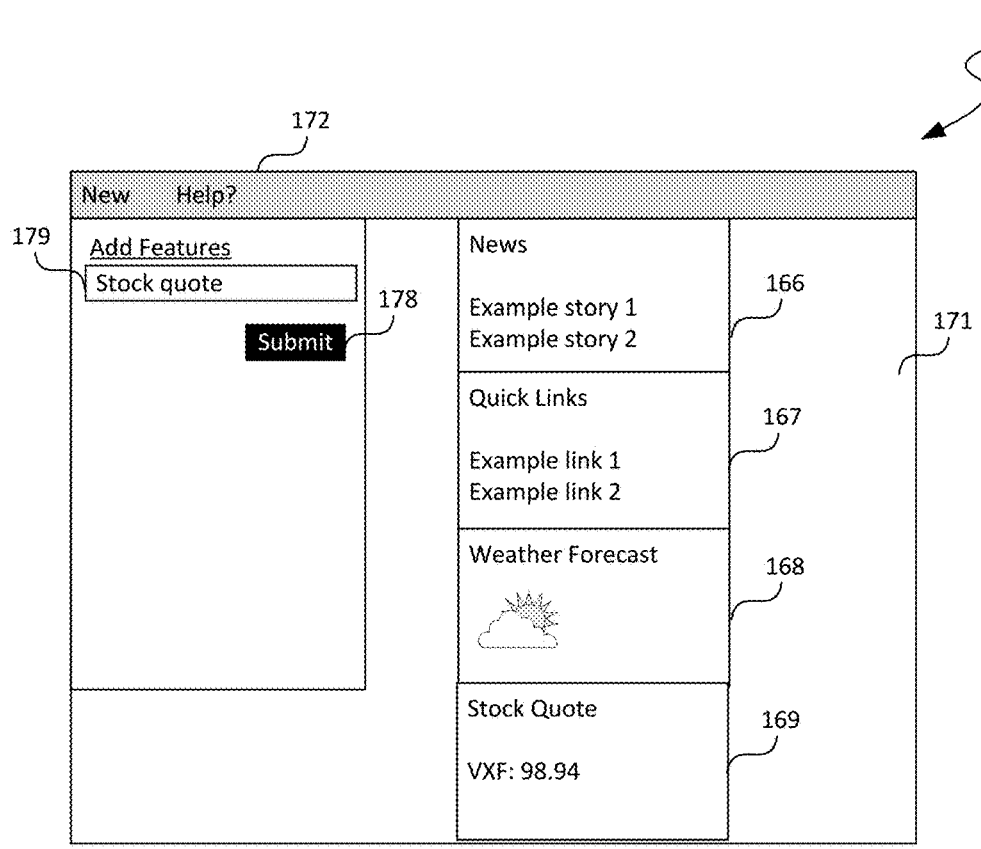

As shown in FIG. 3C, the graphical user interface 170 can also allow a user 101 to activate additional features by providing, for instance, a menu item such as "Add Features" and a corresponding input field 179. In the example shown in FIG. 3C, the user has selected to add another feature "Stock quote" to the site. Once the user 101 actuates the "Submit" button 178, as described above with reference to FIG. 2C, the provisioning controller 110 can cause the management controller 102 to provision for the "Stock quote" feature while allow the user 101 access to other portions of the site, such as, for instance, "News," "Quick Links," and "Weather Forecast." Once provisioned, an additional area "Stock Quote" 169 can be displayed in the content area 171.

Figure 4A:
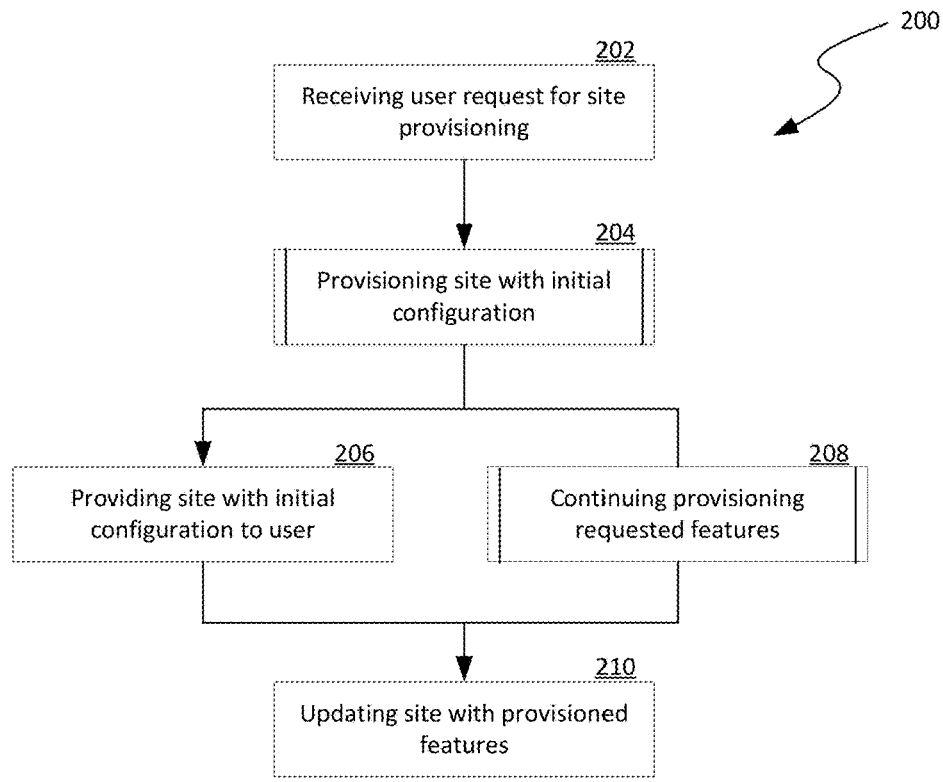
FIGS. 4A-4C are flowcharts illustrating various processes of site provisioning in a distributed computing system in accordance with embodiments of the disclosed technology.
Figure 4B:
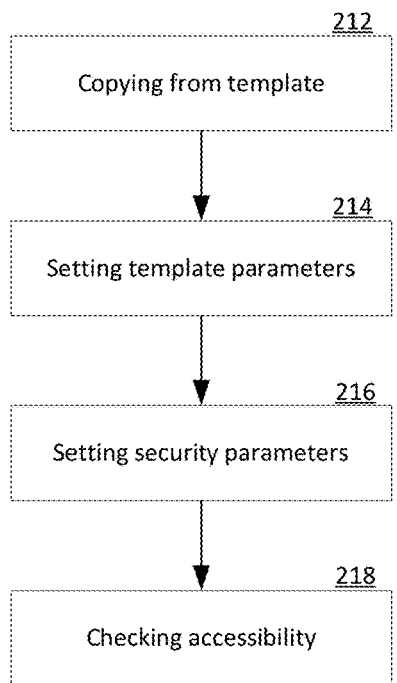
Figure 4C:
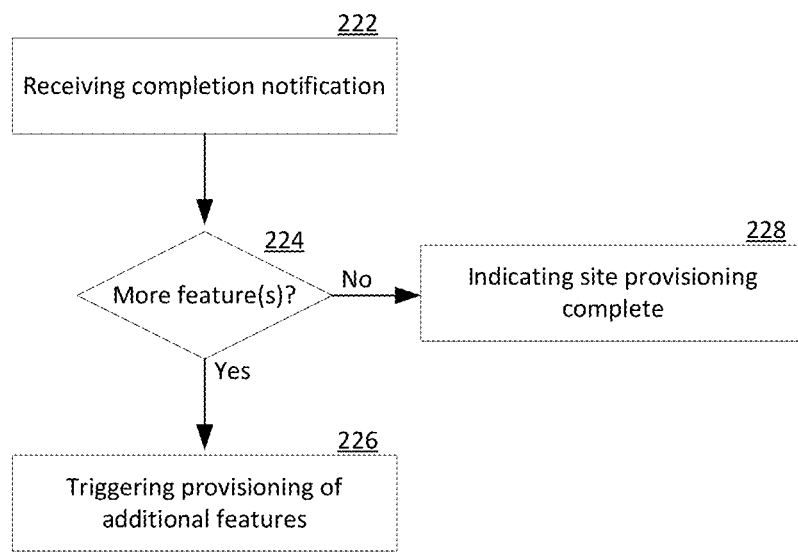

FIGS. 4A-4C are flowcharts illustrating various aspects of processes of site provisioning in a distributed computing system in accordance with embodiments of the disclosed technology. Even though aspects of the processes are described below with reference to the distributed computing system 100 of FIGS. 1A and 1B, in other embodiments, the processes can also be implemented in other computing systems with different or additional components.

As shown in FIG. 4A, the process 200 can include receiving a user request for initiating site provisioning for a site at stage 202. In certain embodiments, the user request can include a list of features for the site, for example, specified by a user via a dropdown menu or other suitable input fields. The process can then include provisioning the site with an initial configuration at stage 202. The initial configuration of the site allows the user to access the site that is functional but lacks one or more of the requested features in the user request. Example operations of provisioning the site with the initial configuration are described in more detail with respect to FIG. 4B.

The process 200 can then include providing the site with the initial configuration for first use by the user at stage 206. The provided site can be without one or more of the requested features in the user request. As such, providing the site with the initial configuration can have very low delay after the user submits the user request. The process 200 can further include continuing provisioning the one or more requested features in the user request while the user is allowed to access the site with the initial configuration at stage 208. Example operations of provisioning the one or more requested features are described in more detail with respect to FIG. 4C. Upon completion of provisioning the one or more requested features, the process 200 can include updating the site with the provisioned one or more requested features at stage 210.

As shown in FIG. 4B, provisioning the site with the initial configuration can include copying a template to create an instance of a site at stage 212. The template can be specified by the user in the user request, by default, by an administrator, or by other suitable entities. The operations can also include setting template parameters at stage 214. Such parameters can include, for example, ownership of the site, tenancy of the user who requested the site, domain name system parameters, or other suitable parameters. The operations can also include setting security parameters at stage 216. Such security parameters can include, for example, privilege level needed for accessing, modifying, or otherwise interacting with the site. The operations can further include checking accessibility of the site by, for example, transmitting test messages/requests to the provisioned site and ensure that the site can be reached and proper responses are returned.

As shown in FIG. 4C, the operations of provisioning additional features can include receiving a completion notification at stage 222. The completion notification can indicate that the site with the initial configuration is completed or provisioning of an additional feature on the site is completed. In response to the received completion notification, the operations can include a decision stage 224 to determine whether additional features are included in the original user request or has been requested by the user via the provided site. In response to determining that provisioning of additional feature(s) is needed, the operations proceed to triggering provisioning of additional features on the site at stage 226; otherwise, the operations can include indicating that site provisioning is complete at stage 228.

Figure 5:
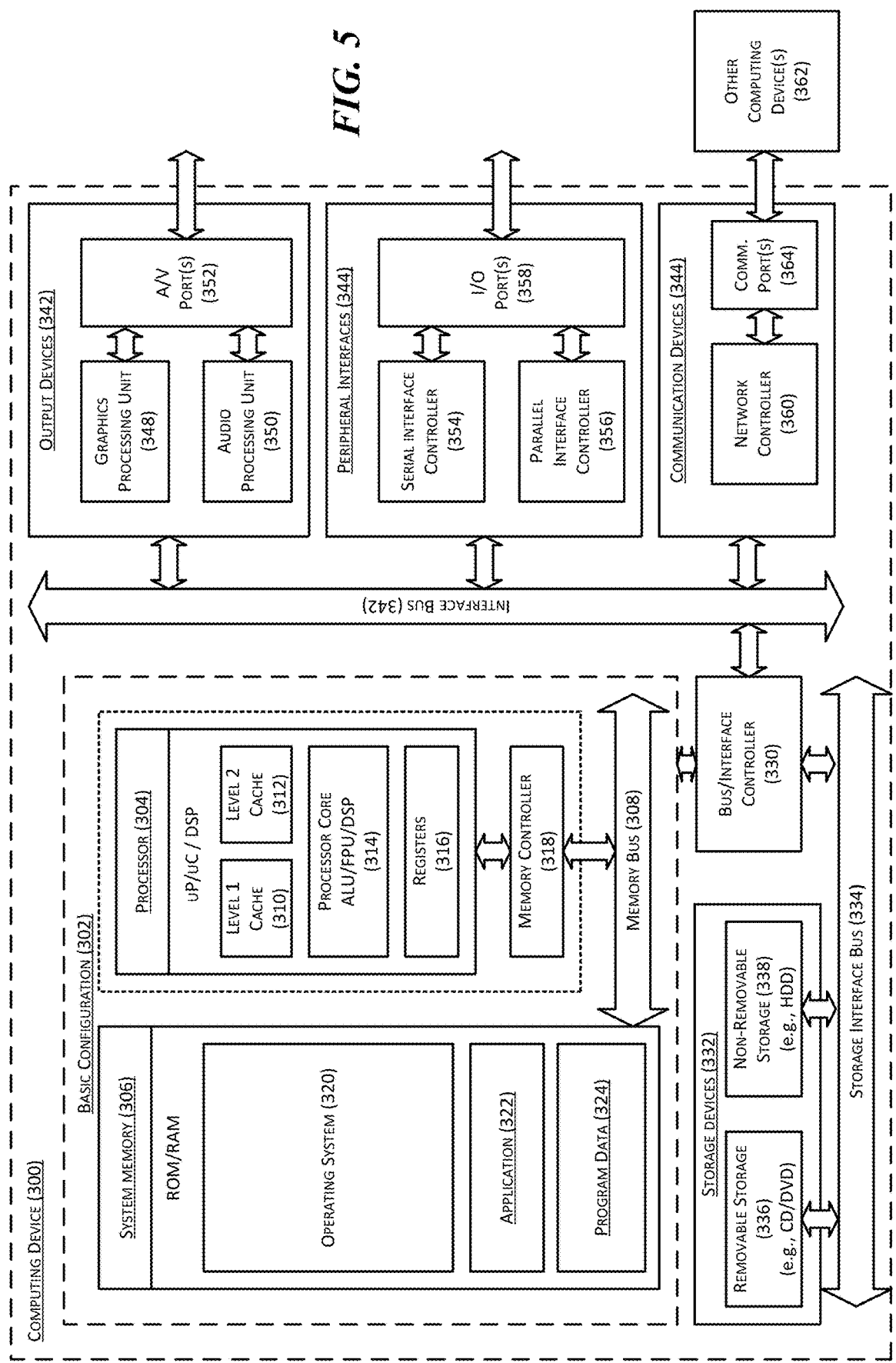
FIG. 5 is a computing device suitable for certain components of the computing system in FIG. 1A.

FIG. 5 is a computing device 300 suitable for certain components of the distributed computing system 100 in FIG. 1A. For example, the computing device 300 can be suitable for the nodes 106, the management controller 102, or the provisioning controller 110 of FIG. 1A. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (pP), a microcontroller (pC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of site provisioning in a distributed computing system having multiple nodes, the method comprising:
   receiving, via a computer network, a user request from a user to initiate a provisioning process for a site to be hosted on one or more nodes in the distributed computing system, the user request containing one or more specified features for the site, the specified features corresponding to computer programs execution of which extend functionality of the site; and
   in response to the received user request from the user,
      performing provisioning of the site to be hosted by one or more of the nodes in the distributed computing system without provisioning for at least one of the specified features in the user request; and
      upon completion of performing provisioning of the site, providing the provisioned site for access by the user via the computer network without the at least one of the specified features included in the user request; and
      continuing provisioning the at least one of the specified features included in the user request while allowing the user to access the provided site without the at least one of the specified features via the computer network.

2. The method of claim 1 wherein the site includes a container that is accessible via the computer network, the container having content and one or more features of content management.

3. The method of claim 1, further comprising upon completion of provisioning of the at least one of the specified features included in the user request, providing an updated site provisioned with the at least one of the requested features to the user.

4. The method of claim 3 wherein performing provisioning the at least one of the requested features included in the user request on the site includes performing one or more of:
   setting a user interface for the provided site including setting one or more of a layout, a fond, a size, or a color of the user interface; or
   providing the user an option to activate additional features on the site.

5. The method of claim 1, further comprising:
   receiving, from the user, another user request requesting activation of an additional feature on the provided site; and
   in response to receiving the another user request, performing provisioning of the additional feature included in the another user request on the site while allowing the user access to the site.

6. The method of claim 1, further comprising:
   receiving, from the user, another user request requesting activation of an additional feature on the provided site; and
   in response to receiving the another user request,
      determining whether the additional feature is one of the requested features included in the user request; and
      in response to determining that the additional feature is not one of the requested features included in the user request, performing provisioning of the additional feature included in the another user request on the site while allowing the user access to the site.

7. The method of claim 1, further comprising:
   receiving, from the user, another user request requesting activation of an additional feature on the provided site; and
   in response to receiving the another user request,
      determining whether the additional feature is one of the requested features included in the user request; and
      in response to determining that the additional feature is one of the requested features included in the user request, ignoring the another user request requesting activation of the additional feature on the provided site.

8. The method of claim 1 wherein provisioning the site to be hosted by one or more of the nodes in the distributed computing system without at least one of the requested features in the user request includes:
   copying a site template; and
   setting one or more parameters of the copied site template, the one or more parameters including:
      an identification of ownership of the site;
      an identification of tenancy of the site; or
      one or more domain name system parameters for the site.

9. The method of claim 1, further comprising:
upon detecting failure of performing provisioning of one of the specified features included in the user request,
indicating to the user that a failure of provisioning for the one of the specified features included in the user request is detected; and
continuing to provide the user with the site without the one of the specified features related to the detected failure.

10. The method of claim 1, further comprising:
receiving, from the user, another user request requesting activation of an additional feature on the provided site, the additional feature being not included in the user request; and
in response to receiving the another user request, performing provisioning of the additional feature included in the another user request on the site while allowing the user access to the site.

11. The method of claim 1, further comprising:
receiving, from the user, another user request requesting activation of an additional feature on the provided site; and
in response to receiving the another user request,
determining whether the additional feature is one of the requested features included in the user request; and
in response to determining that the additional feature is not one of the requested features included in the user request, performing provisioning of the additional feature included in the another user request on the site while allowing the user access to the site.

12. The method of claim 1, further comprising:
receiving, from the user, another user request requesting activation of an additional feature on the provided site; and
in response to receiving the another user request,
determining whether the additional feature is one of the requested features included in the user request; and
in response to determining that the additional feature is one of the requested features included in the user request, ignoring the another user request requesting activation of the additional feature on the provided site.

13. The method of claim 1 wherein provisioning the site to be hosted by one or more of the nodes in the distributed computing system without at least one of the requested features in the user request includes:
copying a site template; and
setting one or more parameters of the copied site template, the one or more parameters including:
an identification of ownership of the site;
an identification of tenancy of the site; or
one or more domain name system parameters for the site.

14. A computing device configured to perform site provisioning in a distributed computing system having multiple nodes, the computing device comprising:
a processor; and
a memory operatively coupled to the processor, the memory containing instructions executable by the processor to cause the computing device to:
receive, via a computer network, a user request for a site to be hosted on one or more nodes in the distributed computing system, the user request containing one or more specified features for the site, the specified features corresponding to computer programs execution of which extend functionality of the site; and
in response to the received user request from the user,
initially provision the site to be hosted by one or more of the nodes in the distributed computing system without provisioning for at least one of the specified features in the user request; and
upon completion of initially provisioning the site, allow access to the initially provisioned site via the computer network even though the initially provisioned site is without the at least one of the specified features in the user request; and
while the initially provisioned site remains accessible via the computer network, continue to provision the at least one of the specified features in the user request.

15. The computing device of claim 14 wherein the instructions are executable by the processor to cause the computing device to:
receive, from the user, another user request requesting activation of an additional feature on the provided site; and
in response to receiving the another user request, provision the additional feature included in the another user request on the site while allowing the user access to the site.

16. The computing device of claim 14 wherein the instructions are executable by the processor to cause the computing device to:
receive, from the user, another user request requesting activation of an additional feature on the provided site; and
in response to receiving the another user request,
determine whether the additional feature is one of the requested features included in the user request; and
in response to determining that the additional feature is not one of the requested features included in the user request, provision the additional feature included in the another user request on the site while allowing the user access to the site.

17. The computing device of claim 14 wherein the instructions are executable by the processor to cause the computing device to:
receive, from the user, another user request requesting activation of an additional feature on the provided site; and
in response to receiving the another user request,
determine whether the additional feature is one of the requested features included in the user request; and
in response to determining that the additional feature is one of the requested features included in the user request, ignore the another user request requesting activation of the additional feature on the provided site.

18. The computing device of claim 14 wherein the instructions are executable by the processor to cause the computing device to:
upon detecting failure of performing provisioning of one of the specified features included in the user request,
indicate to the user that a failure of provisioning for the one of the specified features included in the user request is detected; and
continue to provide the user with the site without the one of the specified features related to the detected failure.

19. A method of site provisioning in a distributed computing system having multiple nodes, the method comprising:

receiving, via a computer network, a user request from a user to initiate a provisioning process for a site to be hosted on one or more nodes in the distributed computing system, the user request containing a plurality of features specified by the user for the site, the plurality of features individually corresponding to a computer program execution of which extend functionality of the site; and in response to the received user request from the user, determining an initial configuration of the site based on the received user request, the initial configuration having a subset of the multiple features specified by the user without at least one of the features specified by the user;

performing provisioning of the site to be hosted by one or more of the nodes in the distributed computing system according to the determined initial configuration without provisioning for the at least one of the features in the user request; and upon completion of performing provisioning of the site according to the initial configuration, providing the provisioned site for first use by the user via the computer network without the at least one of the features included in the user request; and upon providing the provisioned site for the first use by the user, continuing provisioning the at least one of the features included in the user request while allowing the user to access the provided site without the at least one of the features via the computer network.

20. The method of claim 19 wherein performing provisioning includes performing one or more of:

setting a user interface for the provided site including setting one or more of a layout, a fond, a size, or a color of the user interface; or providing the user an option to activate additional features on the site.

* * * * *